(12) United States Patent
Nelson

(10) Patent No.: US 9,028,634 B2
(45) Date of Patent: May 12, 2015

(54) METHOD AND APPARATUS FOR PRODUCING OFF-AXIS COMPOSITE PREPREG MATERIAL

(75) Inventor: Paul E. Nelson, University Place, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/914,592

(22) Filed: Oct. 28, 2010

(65) Prior Publication Data

US 2011/0041988 A1     Feb. 24, 2011

Related U.S. Application Data

(63) Continuation of application No. 11/455,609, filed on Jun. 19, 2006, now abandoned.

(51) Int. Cl.

| | |
|---|---|
| *B29C 69/00* | (2006.01) |
| *B65H 81/00* | (2006.01) |
| *B29C 70/50* | (2006.01) |
| *B29C 53/68* | (2006.01) |
| *B29C 70/20* | (2006.01) |
| *B29C 70/54* | (2006.01) |
| *B29K 707/04* | (2006.01) |

(52) U.S. Cl.
CPC .............. *B29C 70/50* (2013.01); *B29C 53/68* (2013.01); *B29C 70/202* (2013.01); *B29C 70/545* (2013.01); *B29C 2793/009* (2013.01); *B29K 2707/04* (2013.01)

(58) Field of Classification Search
USPC ......... 156/169–175, 250, 252, 253, 443, 446, 156/459, 468, 470, 471, 510, 516
See application file for complete search history.

(56) References Cited

U.S. PATENT DOCUMENTS

| | | | |
|---|---|---|---|
| 2,723,705 | A | 11/1955 | Collins |
| 3,566,733 | A | 3/1971 | McClean |
| 3,682,734 | A | 8/1972 | Burger |
| 4,511,424 | A | 4/1985 | Usui |
| 4,532,169 | A | 7/1985 | Carley |
| 5,127,974 | A * | 7/1992 | Tomiyama et al. ............. 156/85 |
| 5,173,138 | A | 12/1992 | Blauch et al. |
| 5,225,021 | A * | 7/1993 | Lona ............................. 156/190 |
| 5,653,646 | A | 8/1997 | Negishi et al. |
| 5,795,426 | A | 8/1998 | Jackson et al. |
| 6,096,164 | A | 8/2000 | Benson et al. |
| 6,968,883 | B2 * | 11/2005 | Torres Martinez ........... 156/433 |
| 2003/0209312 | A1 * | 11/2003 | Hauber ........................ 156/172 |

FOREIGN PATENT DOCUMENTS

| | | |
|---|---|---|
| JP | 57169319 | 10/1982 |
| JP | 2003221771 A | 8/2003 |
| WO | 9955519 | 11/1999 |
| WO | 2005115754 A1 | 8/2005 |

* cited by examiner

*Primary Examiner* — Philip Tucker
*Assistant Examiner* — Christopher C Caillouet
(74) *Attorney, Agent, or Firm* — Yee & Associates, P.C.

(57) ABSTRACT

The embodiments are directed to a method and apparatus for preferably producing a two layer off-axis composite prepreg material in tape form that has fiber direction at angles such as plus or minus five degrees to the longitudinal direction of the backing paper. The use of such off-axis prepreg composite material tape is primarily for fabricating high length-to-width ration parts such as composite wing stringers or spars for aircraft.

20 Claims, 2 Drawing Sheets

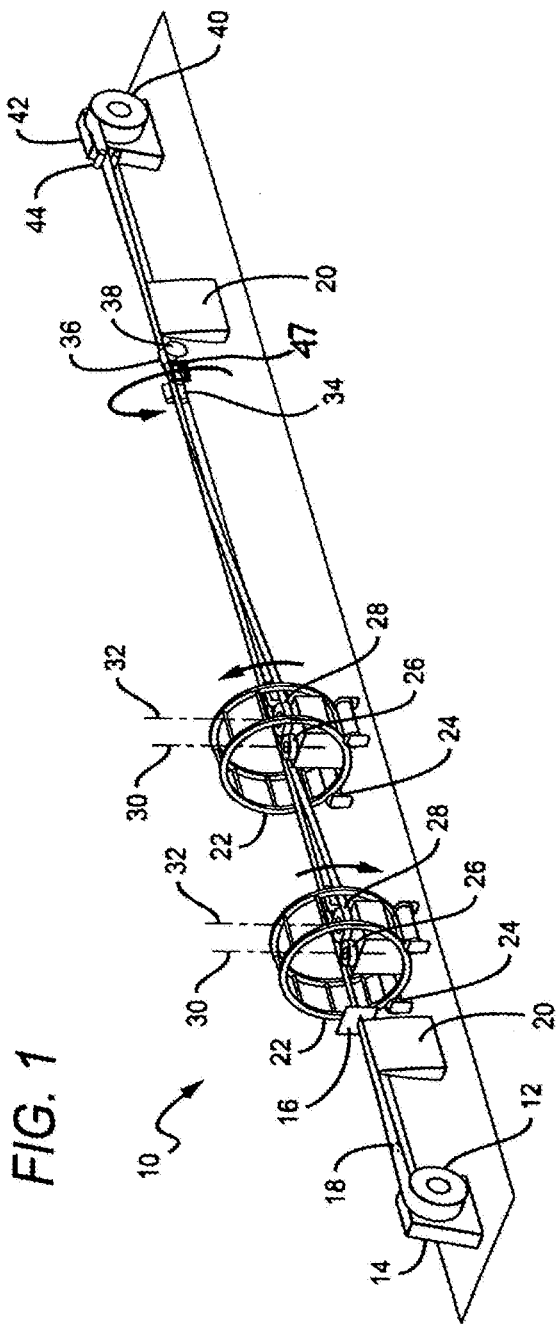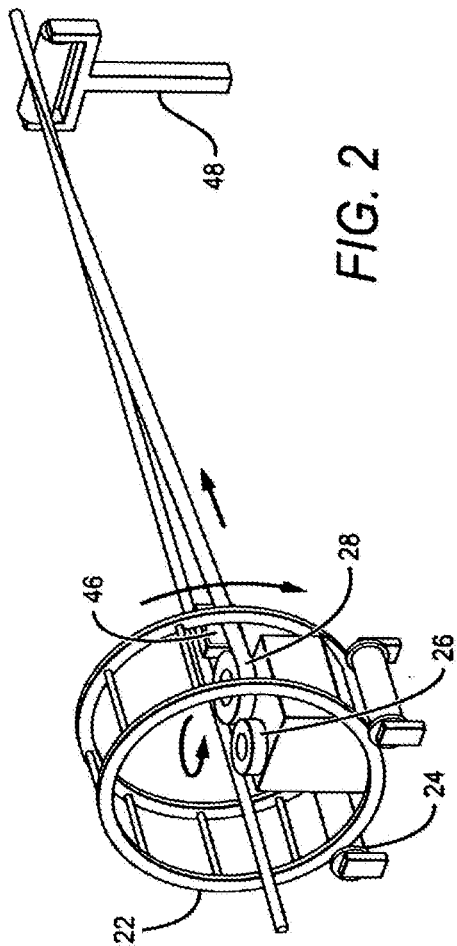

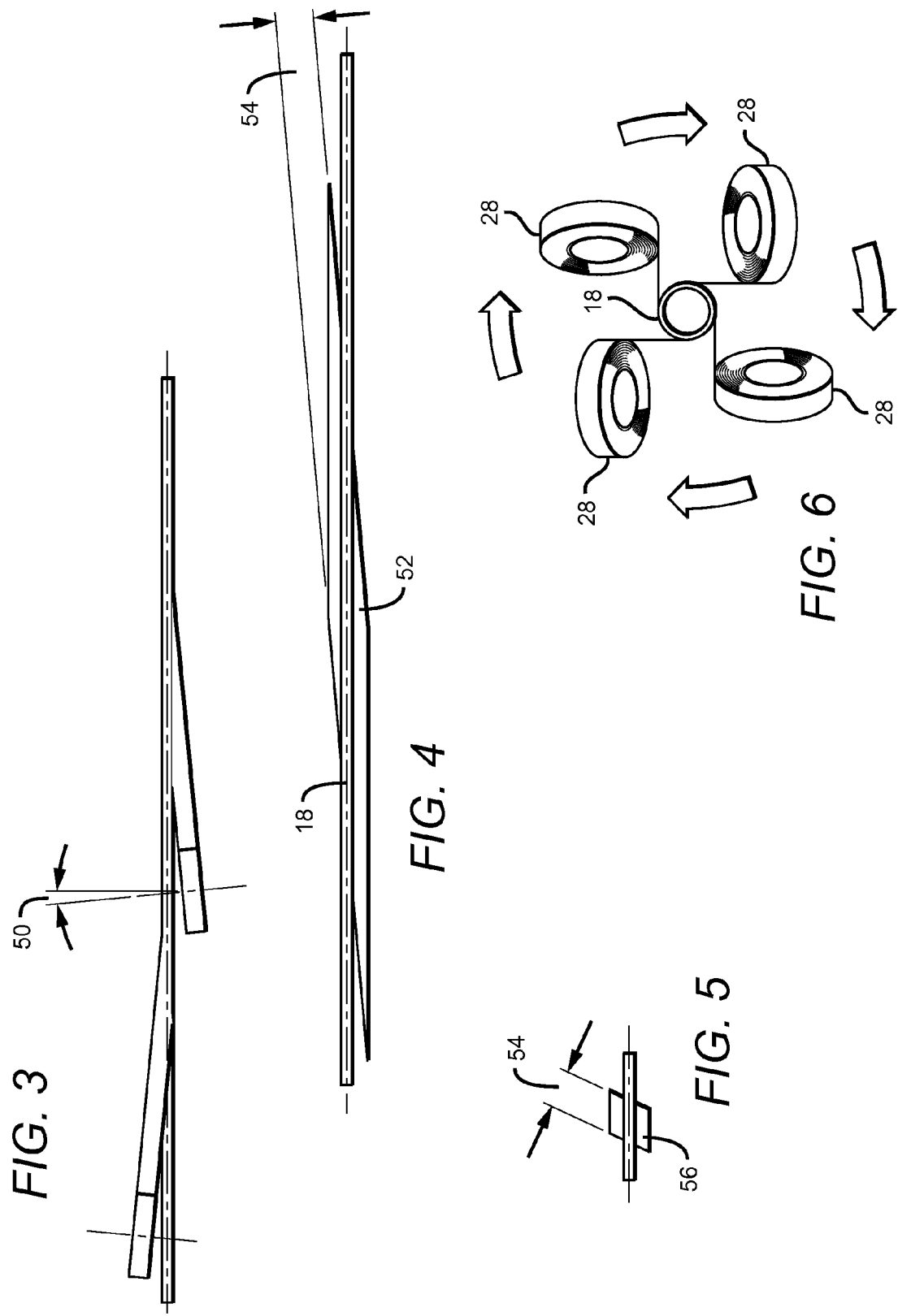

METHOD AND APPARATUS FOR PRODUCING OFF-AXIS COMPOSITE PREPREG MATERIAL

CROSS-REFERENCE TO RELATED APPLICATIONS

This application is a continuation of and claims priority to U.S. application Ser. No. 11/455,609, filed on Jun. 19, 2006 now abandoned and entitled METHOD AND APPPARATUS FOR PRODUCING OFF-AXIS COMPOSITE PREPREG MATERIAL, now abandoned, the entire contents of which is expressly incorporated herein by reference.

BACKGROUND INFORMATION

1. Field

The embodiments relate to composite material, and more specifically to a method and apparatus for producing off-axis composite prepreg material for fabricating composite parts for aircraft.

2. Background

Known methods and apparatuses exist for producing multi-ply tape and fabricating cross-plied structural material. Such known methods include using many layers of carbon tape with standard ply angle fiber orientations, such as 0 degree, plus and minus 45 degree, and 90 degree. Newer investigations indicate that there may be very significant weight savings using nonstandard ply angle fiber orientation, such as plus and minus 5 degree, and plus and minus 65 degree ply angle orientations for aircraft composite parts. The 65 degree ply angle orientations can easily be laid down with existing equipment. However, the plus and minus 5 degree ply angle orientation causes difficulty for current lay-up processes, especially for narrow aircraft composite parts, such as stringer lay-ups. Making very shallow angle cuts in prepreg tape is impractical or impossible with all current prepreg laminating machines. It is possible to avoid shallow angle cuts by running the courses off the edge of the part, but this causes large amounts of material to be wasted. Currently, to gain the weight benefit of these shallow angle lay-ups, manual cutting and lay-up is required. Even with manual cutting, this can be difficult because of the length of the cuts (i.e., about 69 inches long for a 6 inch wide tape) and the long wispy tails that result that are hard to manage. The preferred approach is to obtain a roll of prepreg material that is already arranged in one layer of plus 5 degree tape and a second layer of minus 5 degree tape. However, such a product configuration is not known or available.

There is research that indicates that use of nonstandard ply angle orientations can result in significant weight savings. But the implementation methods are limited. Hand lay-up is expensive, and lay-up with existing machines causes significant material waste, especially for narrow parts. If the plus and minus 5 degree material is efficiently produced, it can be laid down with conventional tape laying machines. In fact, it can increase productivity because two layers may be laid down at once.

Accordingly, there is a need for an improved method and apparatus for producing off-axis composite prepreg material that does not have the problems associated with known methods and devices.

SUMMARY

The advantageous embodiments provide for an apparatus for producing a two layer off-axis composite prepreg material in tape form. A roll of backing paper is mounted on a first roll stand. At least one paper guide is adapted to unroll the backing paper and wrap the backing paper around a cylindrical mandrel supported on at least two mandrel stands. At least two application wheels are supported independently of the mandrel and designed to rotate co-axially around the mandrel in opposite directions to one another. Within each wheel is mounted a paper stripping roll, and at least one composite prepreg supply roll having prepreg material. The paper stripping roll and the prepreg supply roll are on respective axes that are off-axis relative to a normal vector from a centerline of the mandrel. Each wheel is designed to synchronously lay from the prepreg supply roll a tape layer over the backing paper in a helix orientation around the mandrel. The apparatus further includes a compacting component for compacting and pressing the prepreg material onto the backing paper to form a prepreg tube wrapped around the mandrel. A cutting component is provided for cutting the prepreg tube. An opener component is provided for opening and laying flat the cut prepreg tube to form a substantially flat two layer off-axis composite prepreg output material in tape form formed from the backing paper and the composite prepreg. The tape is wrapped around to form an output roll mounted on a second roll stand.

The advantageous embodiments also provide for an apparatus for producing a three or more layer off-axis composite prepreg material in tape form. The apparatus includes a roll of backing paper mounted on a first roll stand. At least one paper guide is adapted to unroll the backing paper and wrap the backing paper around a cylindrical mandrel supported on at least two mandrel stands. A plurality of application wheels is provided, equal in number to the number of layers of composite prepreg material to be formed. Each application wheel is supported independently of the mandrel and designed to rotate around the mandrel. Within the wheel is mounted a paper stripping roll and one composite prepreg supply roll having prepreg material. The paper stripping roll and the supply roll are on respective axes that are off-axis relative to a normal vector from a centerline of the mandrel. Each wheel is designed to lay from the prepreg supply roll a tape layer over the backing paper in a helix orientation around the mandrel. The apparatus also includes a compacting component for compacting and pressing the prepreg material onto the backing paper to form a prepreg tube wrapped around the mandrel. A cutting component is provided for cutting the prepreg tube. An opener component is provided for opening and laying flat the cut prepreg tube to form a substantially flat three or more layer off-axis composite prepreg material in tape form formed from the backing paper and the composite prepreg. The tape is wrapped around to form an output roll mounted on a second roll stand.

The advantageous embodiments also provide for a method for producing a two layer off-axis composite prepreg material in tape form. The method includes unrolling a roll of backing paper mounted on a first roll stand and wrapping the backing paper around a cylindrical mandrel supported on at least two mandrel stands. At least two application wheels are rotated co-axially around the mandrel in opposite directions to one another. Each wheel is mounted a paper stripping roll and at least one composite prepreg supply roll having prepreg material. The paper stripping roll and the supply roll are on respective axes that are off-axis relative to a normal vector from a centerline of the mandrel. Each wheel synchronously lays from the prepreg supply roll a tape layer over the backing paper in a helix orientation around the mandrel. The method also includes compacting and pressing with a compacting component the prepreg material onto the backing paper to form a prepreg tube wrapped around the mandrel. A cutting component cuts the prepreg tube. The method also includes opening and laying flat with an opener component the cut prepreg tube to form a substantially flat two layer off-axis composite prepreg material in tape form formed from the backing paper and the composite prepreg. The composite prepreg tape is wrapped around to form an output roll mounted on a second roll stand.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 1 is a perspective view illustrating the apparatus for producing off-axis composite prepreg material according to one embodiment;

FIG. 2 is a perspective view illustrating the wheel portion of the apparatus of the embodiments that incorporates a heater component;

FIG. 3 is an illustration of an orientation angle of the prepreg supply rolls to the axis of the mandrel for plus 5 degrees and minus 5 degrees;

FIG. 4 is an illustration of the orientation angle of the prepreg supply rolls to the axis of the mandrel when a 5 degree ply is laid flat;

FIG. 5 is an illustration of the orientation angle of the prepreg supply rolls to the axis of the mandrel when a 65 degree ply is laid flat; and FIG. 6 is an illustration of four prepreg supply rolls inside an application wheel, applying one full ply around the mandrel.

DETAILED DESCRIPTION

The embodiments now will be described more fully hereinafter with reference to the accompanying drawings, in which some, but not all embodiments of the embodiments are shown. Indeed, this embodiments may be embodied in several different forms and should not be construed as limited to the embodiments set forth herein. Rather, these embodiments are provided so that this disclosure will be thorough and complete and will fully convey the scope of the embodiments to those skilled in the art. Like numbers refer to like elements throughout.

Referring now to the drawings, and in particular, to FIG. 1, there is shown an apparatus and system 10 for producing a two layer off-axis composite prepreg material in tape form according to one embodiment. The embodiments are directed to a method and apparatus to convert rolls of zero degree composite prepreg (the commodity material configuration) preferably into rolls of material with two layers of plus and minus 5 degree orientation. This resulting product may be loaded into existing lay-up machines, such as a conventional composite tape lamination machine, and dispensed as if it were conventional zero degree material. The configuration of the converting machine may be the same whether used by a material vendor or by a part fabricator. The term "prepreg" as used herein is a shortened version of the term "preimpregnated". Prepreg material is a combination of mat, fabric, or nonwoven material with resin which is typically cured. Standard prepreg contains more resin than is desired in the finished part, and excess resin is bled off during cure. Net resin prepreg contains the same resin content that is desired in the finished part, and no resin is bled off during cure. Prepreg containing a chemical thickening agent is called a mold-mat and those in sheet form are called sheet molding compounds.

The apparatus 10 comprises a roll of backing paper 12 mounted on and supported by a first roll stand 14. Preferably, the backing paper is a paper material with a non-stick coating that is provided on a cardboard tube or core. The apparatus 10 further comprises at least one paper guide 16 adapted to unroll or unspool the backing paper 12 and wrap the backing paper around a cylindrical mandrel 18 supported on at least two mandrel stands 20. The apparatus 10 further comprises at least two application wheels 22 supported independently of the mandrel 18 and designed to rotate co-axially around the mandrel, preferably in opposite directions to one another. Each wheel 22 is supported and driven by a drive roller 24. Each wheel 22 carries a paper stripping roll 26 and at least one prepreg supply roll 28 having prepreg material. The paper stripping roll 26 is mounted on axis 30. The prepreg supply roll is mounted on axis 32. The axes 30, 32 are slightly skewed relative to a normal vector from a mandrel centerline. The wheels 22 rotate in opposite directions, each laying a prepreg tape in a helix orientation around the mandrel. Each wheel 22 is designed to synchronously lay from the prepreg supply roll a helix oriented tape layer over the backing paper as it moves along the mandrel. The rotation of the wheels is synchronized, either mechanically or electronically, to the linear motion of the backing paper as it moves along the mandrel. This ensures that each helix layer provides 100% coverage of the mandrel. Each application wheel may include one, two, three, four or more prepreg supply rolls, depending on the available widths of supply material. In another version, three or more application wheels may be used in the apparatus to provide a three or more layer off-axis composite prepreg material or prepreg tape. In another version of the apparatus, only one application wheel may be used in the apparatus to provide a single layer composite prepreg material or prepreg tape. The apparatus may be constructed with only one application wheel. Alternatively, the apparatus may be constructed with two application wheels and one of the wheels is disengaged and not used. Alternatively, the apparatus may be constructed with three or more application wheels. The required width of the supply rolls depends on the ply angle, where a small ply angle relative to the axis requires a wider tape than a larger ply angle. The required supply width can be obtained from more than one supply roll within the application wheel. Preferably, the prepreg material on the supply roll has a thickness of from about 0.007 inches to about 0.0085 inches, and more preferably, the prepreg material has a thickness of 0.008 inches. Preferably, the backing paper has a width of 24 inches and a thickness of approximately 0.005 inches. However, other suitable widths of backing paper may also be used. In all cases, the diameter of the mandrel must be equal to or less than the width of the backing paper divided by pi (pi equals 3.14159265) to ensure that the backing paper will cover the mandrel completely.

The apparatus 10 further comprises a first compacting component 34 for compacting and pressing the prepreg material onto the backing paper 12 to form a prepreg tube 36 wrapped around the mandrel 18. The compacting component 34 is preferably in the form of orbiting compacting rollers that are located farther downstream from the application wheels 22. Optionally, a radiant or convection heat source (not shown) may be used to soften the prepreg tape upstream of the compacting component to aid in the compaction process. The apparatus may further comprise a cutting component 38 for cutting the prepreg tube 36. Preferably, the cutting component 38 is in the form of a slitter wheel that is used to cut the prepreg tube 36 where the edges of the backing paper meet.

The apparatus 10 may further comprise an opener component (not shown) for opening and laying flat the cut prepreg tube 36 to form an output product or roll 40, which when laid out is a substantially flat two layer off-axis composite prepreg material, with backing paper. The prepreg tube 36 is progressively opened to a flat sheet and spooled or wrapped around the output roll 40 which is mounted on a second roll stand 42. Preferably, the output roll has a width of 24 inches and a typical double prepreg thickness of 0.15 inches. However, other suitable widths may also be used. It may be desirable to incorporate another cutting component (not shown) just before the output roll and to use multiple rolls to spool up the output material. For example, the 24-inch width may be cut to go onto four 6-inch wide output rolls. Such a cutting and winding process is commonly used in the industry. The apparatus 10 may further comprise a second compacting component 44 for compacting and pressing the composite prepreg material or tape before it is wrapped around the output roll. In addition, various rollers and heat sources (not shown) may be applied to facilitate the transition from prepreg tube to flat sheet.

FIG. 2 is a perspective view illustrating the wheel 22 of the apparatus of the embodiments that incorporates a heater component 46. Preferably, the heater component is a radiant heater, such as a quartz lamp, that may be used to heat the prepreg supply roll in order to improve the tack of the resin. Preferably, the heater component is positioned adjacent the prepreg supply roll in order to heat the prepreg supply roll to soften it. Preferably, the temperature used to heat the prepreg supply roll is about less than 150 degrees Fahrenheit, and more preferably, the temperature is 90 degrees Fahrenheit. Depending on the span of the mandrel between mandrel stands, a mandrel support roller 48 may be required to prevent the mandrel from sagging. Because the roller 48 will be contacting the prepreg material, it has a non-stick surface, such as a fluorocarbon plastic material. Preferably, the resulting two layer off-axis composite prepreg material comprises uni-directional carbon fibers in an uncured resin matrix where the carbon fibers are oriented at an angle of approximately plus five degrees for a first prepreg layer and minus five degrees for a second prepreg layer from a central axis of the backing paper. In addition, the resulting composite may comprise a two layer off-axis composite prepreg material comprising uni-directional carbon fibers in an uncured resin matrix, where the carbon fibers are oriented at any angle from about 5 degrees to about 85 degrees for a first prepreg layer, and a corresponding minus angle from about 5 degrees to about 85 degrees for a second prepreg layer from a central axis of the backing paper. More preferably, the carbon fibers are oriented at an angle less than 30 degrees for a first prepreg layer, and a corresponding minus angle less than 30 degrees for a second prepreg layer from a central axis of the backing paper.

FIG. 3 is an illustration of an orientation angle 50 of the prepreg supply rolls to the axis of the mandrel for plus 5 degrees and minus 5 degrees. However, various other angles, from 5 degrees to 85 degrees, may be produced with a different machine set up. The number of plies can vary from one to six or more, with embodiments having a corresponding number of wheels in series.

FIG. 4 is an illustration of the orientation angle of the prepreg supply rolls to the axis of the mandrel when a 5 degree ply 52 is laid flat. Each ply orientation requires a different width of the prepreg supply rolls. A shallow ply angle, such as 5 degrees, requires a prepreg supply roll nearly as wide as the output roll width, as shown in FIG. 4. A supply roll width 54 is shown, as well as mandrel 18.

A large ply angle, such as 65 degrees, requires a narrower prepreg supply roll as shown in FIG. 5. FIG. 5 is an is an illustration of the orientation angle of the prepreg supply rolls to the axis of the mandrel when a 65 degree ply 56 is laid flat. The supply roll width 54 is also shown. If the prepreg supply rolls are relatively wide, two or more narrower prepreg supply rolls may be used instead of a single roll to provide the necessary width.

FIG. 6 is an illustration of four prepreg supply rolls 28 inside an application wheel (not shown), applying one full ply around the mandrel 18. The apparatus of the embodiments thus may include four separate application wheels.

In another version of the, embodiments, an apparatus for producing a three or more layer off-axis composite prepreg material in tape form is provided. This apparatus comprises a roll of backing paper mounted on a first roll stand, and at least one paper guide adapted to unroll the backing paper and wrap the backing paper around a cylindrical mandrel supported on at least two mandrel stands. This apparatus further comprises a plurality of application wheels equal in number to the number of layers of composite prepreg material to be formed, wherein each application wheel is supported independently of the mandrel and designed to rotate around the mandrel. Within each wheel is mounted a paper stripping roll and one composite prepreg supply roll having prepreg material, where the paper stripping roll and supply roll are on respective axes that are off-axis relative to a normal vector from a centerline of the mandrel. Further, each wheel is designed to lay from the prepreg supply roll a tape layer over the backing paper in a helix orientation around the mandrel. The apparatus further comprises a compacting component for compacting and pressing the prepreg material onto the backing paper to form a prepreg tube wrapped around the mandrel. The apparatus further comprises a cutting component for cutting the prepreg tube. The apparatus further comprises an opener component for opening and laying flat the cut prepreg tube to form a substantially flat three or more layer off-axis composite prepreg material in tape form formed from the backing paper and the composite prepreg, wherein the tape is wrapped around to form an output roll mounted on a second roll stand. The three or more layer off-axis composite prepreg material comprises uni-directional carbon fibers in an uncured resin matrix, wherein the carbon fibers are oriented at an angle of approximately plus between 5 degrees and eighty-five degrees for a first prepreg layer and minus between 5 degrees and eighty-five degrees for a second prepreg layer from a central axis of the backing paper.

In another version of the, embodiments, a method for producing a two layer off-axis composite prepreg material in an output roll or tape form is provided. The method is similar to existing methods that use conventional composite tape lamination machines that continuously knit a tube of material that is then slit and spooled up as a continuous ribbon. The difference is that the method of the embodiments produces a non-woven product with a much more acute fiber angle than that produced by the knitting process. The method of the embodiments comprise the steps of first unrolling a roll of backing paper 12 mounted on a first roll stand 14 and wrapping the backing paper around a cylindrical mandrel 18 supported on at least two mandrel stands 20. The method further comprises the step of rotating at least two application wheels 22 co-axially around the mandrel in opposite directions to one another, wherein within each wheel is mounted a paper stripping roll 26 and at least one composite prepreg supply roll 28 having prepreg material, where the paper stripping roll and supply roll are on respective axes 30, 32 that are off-axis relative to a normal vector from a centerline of the mandrel.

Each wheel synchronously lays from the prepreg supply roll a prepreg tape in a helix orientation around the mandrel. Each application wheel may include one, two, three, four or more prepreg supply rolls within the wheel. As discussed above, preferably the composite prepreg tape is 6 inches wide. In addition, the method may include one, two, four or more application wheels. The method further comprises the step of compacting and pressing with a first compacting component 34 the prepreg supply roll onto the backing paper to form a prepreg tube 36 wrapped around the mandrel. The method further comprises the step of cutting with a cutting component 38 the prepreg tube. The method further comprises the step of opening and laying flat with an opener component (not shown) the cut prepreg tube to form a substantially flat two layer off-axis composite prepreg material in tape form formed from the backing paper and the composite prepreg. The method further comprises the step of wrapping the composite prepreg tape around to form an output product or roll 40 mounted on a second roll stand 42. The method may further comprise the step prior to the compacting step of heating with a first heater component the prepreg supply roll in order to soften it. The method may further comprise the step prior to the cutting step of heating with a second heater component 47 the prepreg supply roll in order to soften it. Preferably, the temperature used to heat the prepreg supply roll is about less than 150 degrees Fahrenheit, and more preferably, the temperature is 90 degrees Fahrenheit. The method may further comprise the step prior to the wrapping the composite prepreg tape step of compacting and pressing the composite prepreg with a second compacting component 44.

Preferably, the method of the embodiments results in a two layer off-axis composite prepreg material comprising uni-directional carbon fibers in a resin matrix, where the carbon fibers are oriented at an angle of approximately plus five degrees for a first prepreg layer and minus five degrees for a second prepreg layer from a central axis of the backing paper. In addition, the method of the embodiments may result in a two layer off-axis composite prepreg material comprising uni-directional carbon fibers in a resin matrix, wherein the carbon fibers are oriented at an angle of approximately plus less than thirty degrees for a first prepreg layer and minus less than thirty degrees for a second prepreg layer from a central axis of the backing paper. In addition, the method of the embodiments may result in a one layer off-axis composite prepreg material comprising uni-directional carbon fibers in a resin matrix when only one prepreg supply roll within one application wheel is used in the method. The average rate of forming the prepreg composite material output product is about 2000-5000 inches per minute.

The embodiments provide a method and apparatus that can produce rolls of material with a single ply of non-zero fiber orientation or a roll with multiple plies of tape with multiple orientations, such as product with plus 5 degree, minus 5 degree, plus 65 degree, and minus 65 degree plies, all combined in a roll of material. Each layer from such a roll would have strength in multiple directions. The method and apparatus of the embodiments may also produce rolls of material with a single layer of plus or minus 5 degree oriented material. The use of such off-axis prepreg composite material tape is primarily for fabricating high length-to-width ratio parts such as composite wing stringers or spars for aircraft.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. An apparatus for producing a two layer off-axis composite prepreg material in tape form comprising:
    a roll of backing paper mounted on a first roll stand;
    at least one paper guide adapted to unroll the backing paper and wrap the backing paper around a cylindrical mandrel supported on at least two mandrel stands;
    a first application wheel downstream from the at least one paper guide, the first application wheel supported independently of the mandrel and configured to be rotated around the mandrel in a first angular direction, the first application wheel further comprising:
        a first mount comprising a first block connected to the first application wheel such that the first mount rotates around the mandrel as the first application wheel rotates around the mandrel;
        a first paper stripping roll connected to a first side of the first mount, the first paper stripping roll rotatable about a first axis that is about perpendicular to the first mount and that is skewed relative to a normal vector from a centerline of the mandrel;
        a first prepreg supply roll connected to the first side of the first mount and adjacent the first paper stripping roll, the first prepreg supply roll rotatable about a second axis that is about perpendicular to the first mount and that is skewed relative to the normal vector from the centerline of the mandrel;
        wherein the first axis is about parallel to the second axis, and wherein the first paper striping roll is configured to receive first paper from the first prepreg supply roll as the first prepreg supply roll unwinds a first prepreg tape towards the mandrel;
    a second application wheel downstream from the first application wheel, the second application wheel supported independently of the mandrel and configured to be rotated around the mandrel in a second angular direction opposite the first angular direction, the second application wheel further comprising:
        a second mount comprising a second block connected to the second application wheel such that the second mount rotates around the mandrel as the second application wheel rotates around the mandrel;
        a second paper stripping roll connected to a second side of the second mount, the second paper stripping roll rotatable about a third axis that is about perpendicular to the second mount and that is skewed relative to the normal vector from the centerline of the mandrel;
        a second prepreg supply roll connected to the second side of the second mount and adjacent the second paper stripping roll, the second prepreg supply roll rotatable about a fourth axis that is about perpendicular to the second mount and that is skewed relative to the normal vector from the centerline of the mandrel;
        wherein the third axis is about parallel to the fourth axis, and wherein the second paper striping roll is configured to receive second paper from the second prepreg supply roll as the second prepreg supply roll unwinds a second prepreg tape towards the mandrel;
    a compacting component downstream from the second application wheel and configured to compact and press the prepreg material onto the backing paper to form a prepreg tube wrapped around the mandrel;
    a cutting component for cutting the prepreg tube; and, an opener component for opening and laying flat the cut prepreg tube to form a substantially flat two layer off-axis composite prepreg output material in tape form formed from the backing paper and the composite prepreg, wherein the tape is wrapped around to form an output roll mounted on a second roll stand.

2. The apparatus of claim 1 further comprising a first heater component adjacent the first prepreg supply roll for heating the first prepreg supply roll.

3. The apparatus of claim 1, wherein the two layer off-axis composite prepreg material comprises uni-directional carbon fibers in an uncured resin matrix, wherein the carbon fibers are oriented at an angle of approximately plus five degrees for a first prepreg layer and minus five degrees for a second prepreg layer from a central axis of the backing paper.

4. The apparatus of claim 1, wherein the two layer off-axis composite prepreg material comprises uni-directional carbon fibers in an uncured resin matrix, wherein the carbon fibers are oriented at an angle of approximately plus less than thirty degrees for a first prepreg layer and minus less than thirty degrees for a second prepreg layer from a central axis of the backing paper.

5. The apparatus of claim 1, wherein the two layer off-axis composite prepreg material comprises uni-directional carbon fibers in an uncured resin matrix, wherein the carbon fibers are oriented at an angle of approximately plus less than eighty-five degrees for a first prepreg layer and minus less than eighty-five degrees for a second prepreg layer from a central axis of the backing paper.

6. The apparatus of claim 1, wherein each application wheel includes three additional prepreg supply rolls.

7. The apparatus of claim 1, further comprising a third application wheel.

8. The apparatus of claim 1 further comprising a second compacting component for compacting and pressing the composite prepreg tape before it is wrapped around the output roll.

9. The apparatus of claim 1, wherein the compacting component comprises orbiting compacting rollers located downstream from the at least two application wheels.

10. An apparatus for producing a three or more layer off-axis composite prepreg material in tape form comprising:
a roll of backing paper mounted on a first roll stand;
at least one paper guide adapted to unroll the backing paper and wrap the backing paper around a cylindrical mandrel supported on at least two mandrel stands;
a plurality of application wheels downstream from the at least one paper guide, the plurality of application wheels supported independently of the mandrel and configured to be rotated around the mandrel in a plurality of angular directions, the plurality of application wheel further comprising:
a plurality of mounts comprising a plurality of blocks connected to corresponding ones of the plurality of application wheels such that the plurality of mounts rotate around the mandrel as the plurality of application wheel rotate around the mandrel;
a plurality of paper stripping rolls connected corresponding first sides of the plurality of mounts, the plurality of paper stripping rolls rotatable about first axes that are about perpendicular to the corresponding plurality of mounts and that are skewed relative to a normal vector from a centerline of the mandrel;
a plurality of prepreg supply rolls connected to the corresponding first sides of the plurality of mounts and adjacent the plurality of paper stripping rolls on corresponding ones of the plurality of mounts, the plurality of prepreg supply rolls rotatable about second axes that are about perpendicular to corresponding ones of the plurality of mounts and that are skewed relative to the normal vector from the centerline of the mandrel;
wherein the plurality of first axes are about parallel to corresponding ones of the plurality of second axis, and wherein the plurality of paper striping rolls are configured to receive corresponding papers from corresponding ones of the plurality of prepreg supply rolls as the plurality of prepreg supply rolls unwind corresponding prepreg tapes towards the mandrel;
a compacting component for compacting and pressing prepreg material from the plurality of prepreg supply rolls onto the backing paper to form a prepreg tube wrapped around the mandrel;
a cutting component for cutting the prepreg tube; and
an opener component for opening and laying flat the cut prepreg tube to form a substantially flat three or more layer off-axis composite prepreg material in tape form formed from the backing paper and the prepreg material, wherein the tape is wrapped around to form an output roll mounted on a second roll stand.

11. The apparatus of claim 10 wherein the three or more layer off-axis composite prepreg material comprises uni-directional carbon fibers in an uncured resin matrix, wherein the carbon fibers are oriented at an angle of approximately plus between 5 degrees and eighty-five degrees for a first prepreg layer and minus between 5 degrees and eighty-five degrees for a second prepreg layer from a central axis of the backing paper.

12. The apparatus of claim 10, wherein the compacting component comprises orbiting compacting rollers located downstream from the plurality of application wheels.

13. A method for producing a two layer off-axis composite prepreg material in tape form comprising the steps of:
unrolling a roll of backing paper mounted on a first roll stand and wrapping the backing paper around a cylindrical mandrel supported on at least two mandrel stands;
rotating a first application wheel in a first angular direction, the first application wheel downstream from the at least one paper guide and supported independently of the mandrel, the first application wheel further comprising:
a first mount comprising a first block connected to the first application wheel such that the first mount rotates around the mandrel as the first application wheel rotates around the mandrel;
a first paper stripping roll connected to a first side of the first mount, the first paper stripping roll rotatable about a first axis that is about perpendicular to the first mount and that is skewed relative to a normal vector from a centerline of the mandrel;
a first prepreg supply roll connected to the first side of the first mount and adjacent the first paper stripping roll, the first prepreg supply roll rotatable about a second axis that is about perpendicular to the first mount and that is skewed relative to the normal vector from the centerline of the mandrel;
wherein the first axis is about parallel to the second axis, and wherein the first paper striping roll is configured to receive first paper from the first prepreg supply roll as the first prepreg supply roll unwinds a first prepreg tape towards the mandrel;
rotating a second application wheel in a second angular direction, the second application wheel downstream from the first application wheel and supported independently of the mandrel, the second application wheel further comprising:
- a second mount comprising a second block connected to the second application wheel such that the second mount rotates around the mandrel as the second application wheel rotates around the mandrel;
- a second paper stripping roll connected to a second side of the second mount, the second paper stripping roll rotatable about a third axis that is about perpendicular to the second mount and that is skewed relative to the normal vector from the centerline of the mandrel;
- a second prepreg supply roll connected to the second side of the second mount and adjacent the second paper stripping roll, the second prepreg supply roll rotatable about a fourth axis that is about perpendicular to the second mount and that is skewed relative to the normal vector from the centerline of the mandrel;
- wherein the third axis is about parallel to the fourth axis, and wherein the second paper striping roll is configured to receive second paper from the second prepreg supply roll as the second prepreg supply roll unwinds a second prepreg tape towards the mandrel;

applying the first prepreg tape onto the mandrel as the first application wheel rotates;
applying the second prepreg tape onto the mandrel as the second application wheel rotates;
orbiting compaction rollers, downstream of the at least two application wheels, around the mandrel to compact and press the prepreg material onto the backing paper to form a prepreg tube wrapped around the mandrel;
cutting with a cutting component the prepreg tube;
opening and laying flat with an opener component the cut prepreg tube to form a substantially flat two layer off-axis composite prepreg material in tape form formed from the backing paper and the composite prepreg; and
wrapping the composite prepreg tape around to form an output roll mounted on a second roll stand.

14. The method of claim 13 further comprising the step prior to the compacting step of heating with a first heater component the first prepreg supply roll in order to soften it.

15. The method of claim 13 further comprising the step prior to the cutting step of heating with a second heater component the second prepreg supply roll in order to soften it.

16. The method of claim 13 wherein the two layer off-axis composite prepreg material comprises uni-directional carbon fibers in an uncured resin matrix, wherein the carbon fibers are oriented at an angle of approximately plus five degrees for a first prepreg layer and minus five degrees for a second prepreg layer from a central axis of the backing paper.

17. The method of claim 13 wherein the two layer off-axis composite prepreg material comprises uni-directional carbon fibers in an uncured resin matrix, wherein the carbon fibers are oriented at an angle of approximately plus less than thirty degrees for a first prepreg layer and minus less than thirty degrees for a second prepreg layer from a central axis of the backing paper.

18. The method of claim 13 wherein the two layer off-axis composite prepreg material comprises uni-directional carbon fibers in an uncured resin matrix, wherein the carbon fibers are oriented at an angle of approximately plus less than eighty-five degrees for a first prepreg layer and minus less than eighty-five degrees for a second prepreg layer from a central axis of the backing paper.

19. The method of claim 13 further comprising:
applying a third prepreg tape to the mandrel using a third application wheel.

20. The method of claim 13 further comprising:
applying additional prepreg tapes to the mandrel using additional application wheels, wherein a total number of application wheels used equal to the number of layers of off-axis composite prepreg material to be formed.

* * * * *